(12) United States Patent
Burg

(10) Patent No.: US 6,983,708 B1
(45) Date of Patent: Jan. 10, 2006

(54) AMPHIBIOUS MARINE VEHICLE

(76) Inventor: Donald E. Burg, 15840 SW. 84 Ave., Miami, FL (US) 33157

( * ) Notice: Subject to any disclaimer, the term of this patent is extended or adjusted under 35 U.S.C. 154(b) by 0 days.

(21) Appl. No.: 10/943,082

(22) Filed: Sep. 16, 2004

Related U.S. Application Data

(63) Continuation-in-part of application No. 10/924,312, filed on Aug. 23, 2004.

(51) Int. Cl.
*B63B 1/34* (2006.01)
(52) U.S. Cl. .................................. 114/67 R; 440/12.63
(58) Field of Classification Search ............. 114/67 R, 114/67 A, 61.1, 344; 440/5, 12.5, 12.51, 440/12.63
See application file for complete search history.

(56) References Cited

U.S. PATENT DOCUMENTS

| | | | | |
|---|---|---|---|---|
| 3,698,350 A | * | 10/1972 | Gehlen | 440/12.52 |
| 3,951,093 A | * | 4/1976 | Poche | 440/12.63 |
| 3,968,766 A | * | 7/1976 | House | 440/12.67 |
| 4,175,636 A | * | 11/1979 | Broughton | 180/119 |
| 5,727,494 A | * | 3/1998 | Caserta et al. | 114/55.51 |

* cited by examiner

*Primary Examiner*—Stephen Avila

(57) ABSTRACT

Presented in an advanced amphibious marine vehicle that incorporates retractable land drives for operation over beaches or other hard surfaces. In the preferred embodiment, the land drives retract into hull recesses when the vehicle is waterborne so as not to add water resistance when waterborne. Power for water propulsion as well as land drive is normally supplied from the same propulsor motor(s) for simplicity. Land drives may incorporate tracks, tires, or other land contact mechanisms.

29 Claims, 4 Drawing Sheets

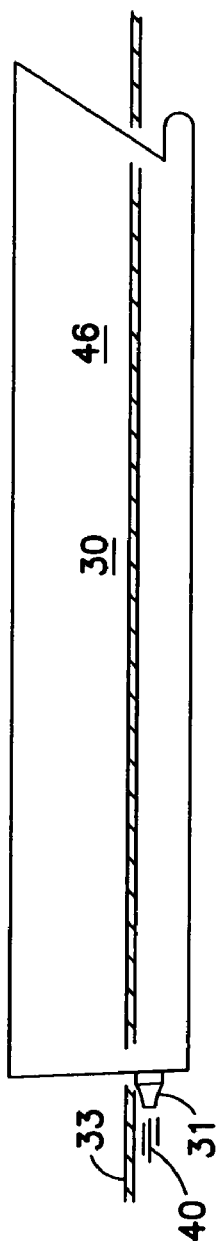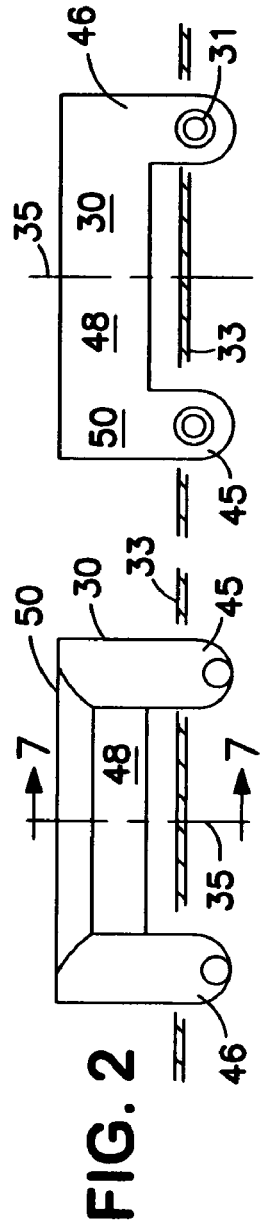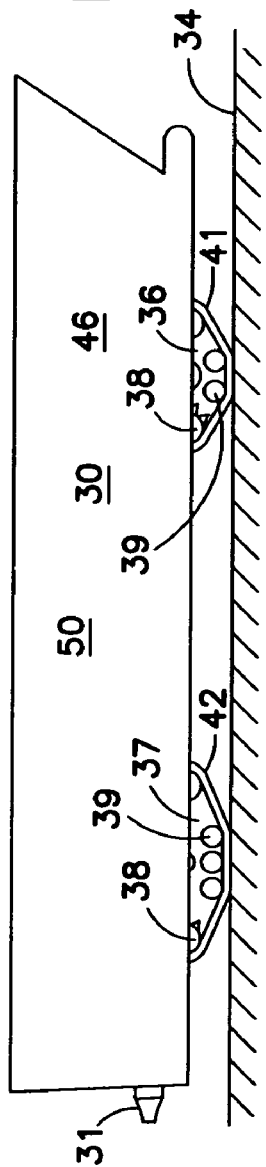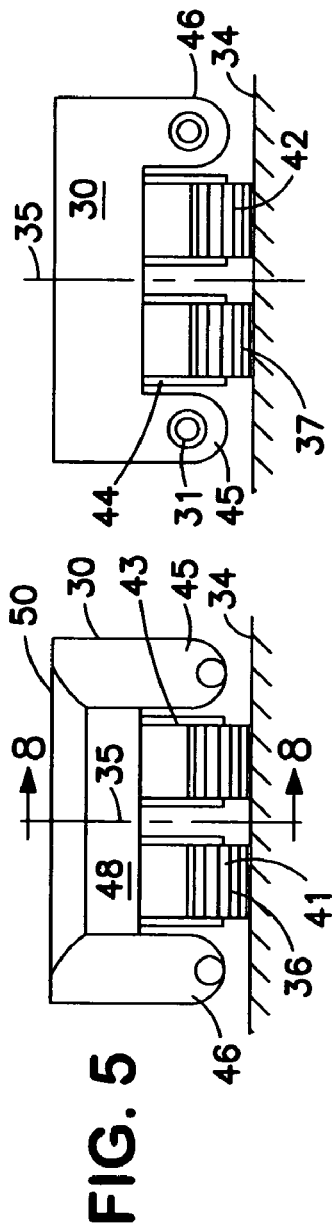

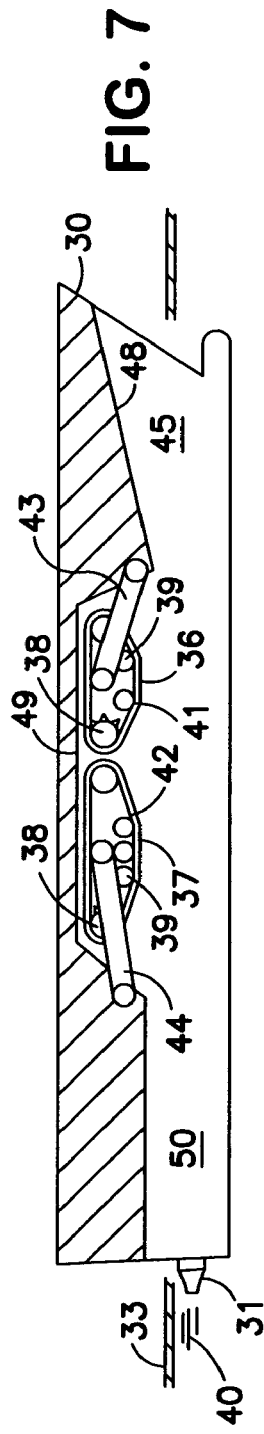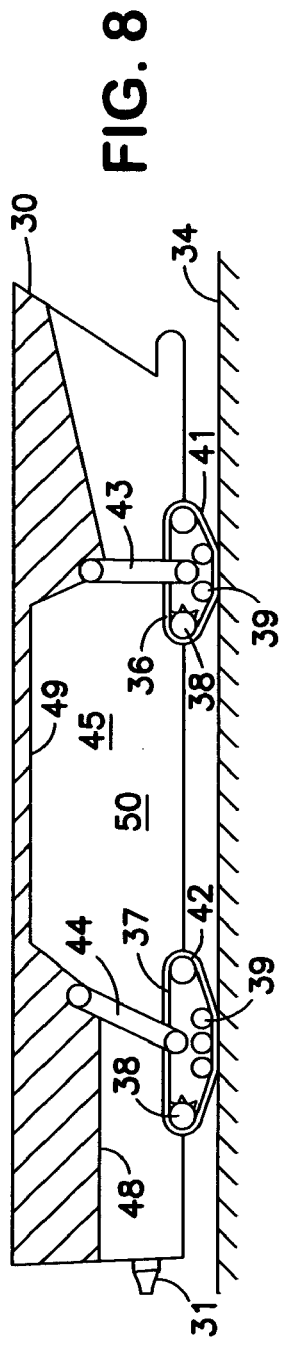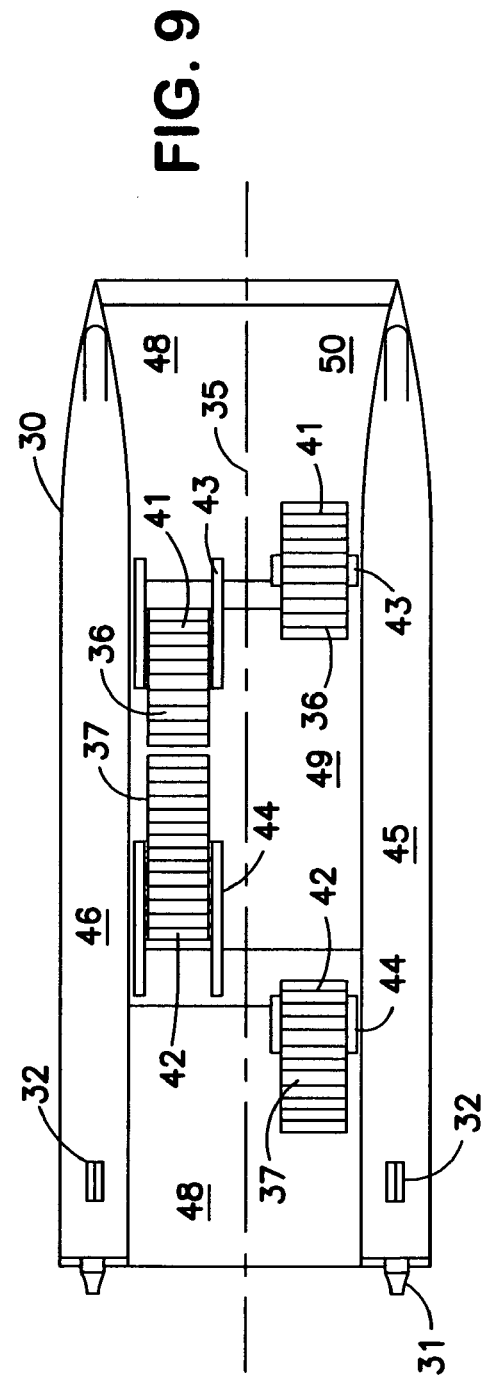

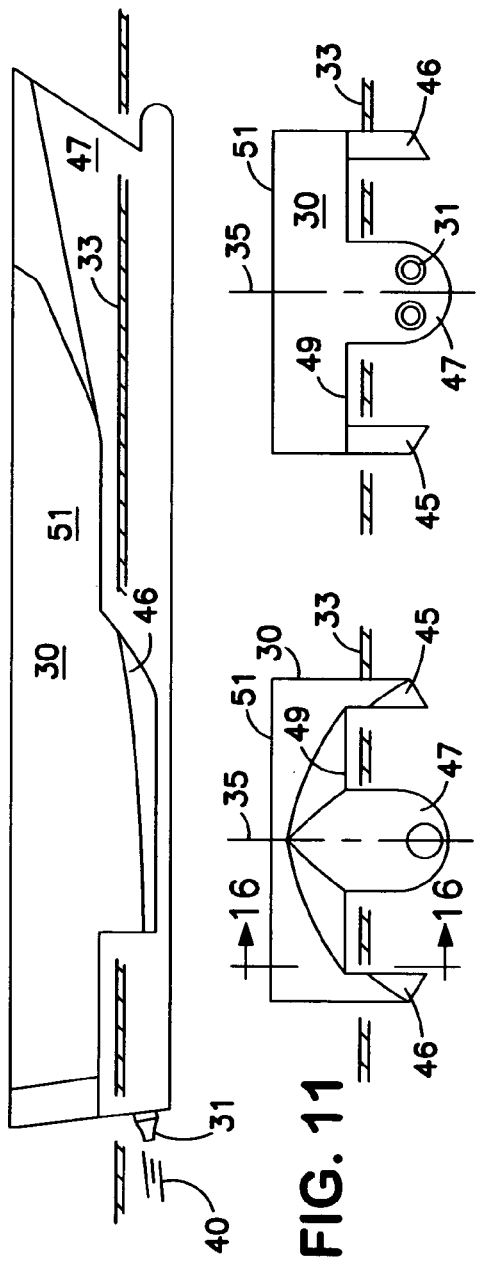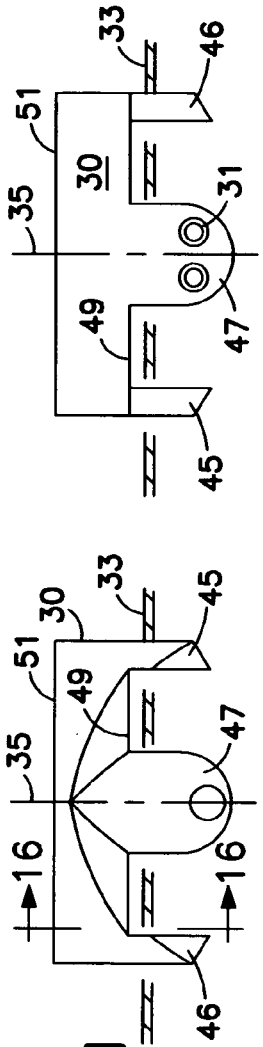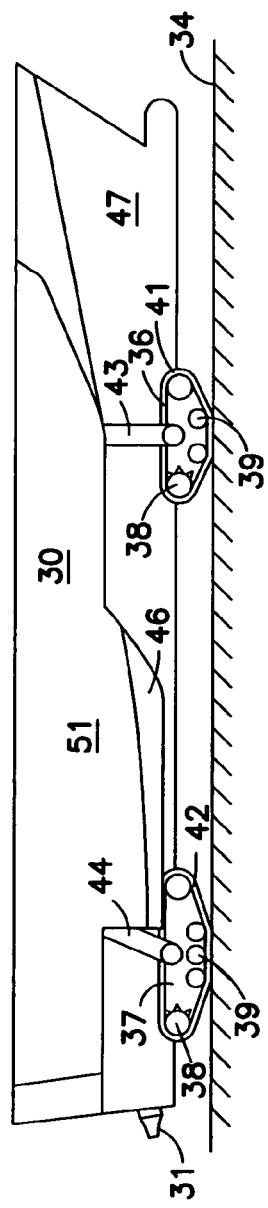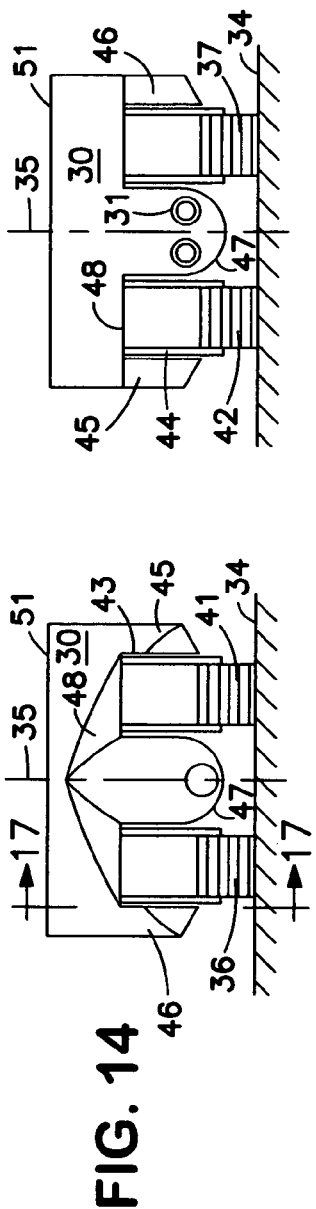

AMPHIBIOUS MARINE VEHICLE

CROSS REFERENCE TO OTHER APPLICATIONS

This application is a continuation-in-part to Ser. No. 10/924,312 filed Aug. 23, 2004.

BACKGROUND OF THE INVENITON

There is a need for amphibious marine vehicles to discharge troops and cargo at beachheads that are based on newer higher speed hull designs than currently available. As an example of currently available landing craft, consider that the Navy's LCU (Landing Craft Utility) has a top speed of about 12 knots and is beachable but not amphibious.

An alternative is the LCAC (Landing Craft Air Cushion) that is not only beachable but also amphibious. The LCAC is supported by a blower pressurized air cushion. The LCAC has a full 360 degree peripheral flexible skirt that attaches to the underside of its hull and restrains the air cushion between the hull and a water or land surface. The LCAC and its like are many times referred to as hovercraft. The LCAC has a number of inherent disadvantages, to wit: 1) It does not handle rough seas well, 2) It has an inherent rough "cobblestone" ride due to pressure perturbations in its air cushion where the pressure perturbations are mainly attributed to its full 360 degree flexible seals, 3) It is very weight sensitive, 4) It can only access beachheads that have gently sloped beaches, 4) Its full 360 degree flexible seals are expensive initially and to maintain, 6) Largely due to its need for power from three 4,500 HP gas turbines that supply propulsion and blower power, it is expensive initially with a current price of over $20 million, and 7) It is very noisy due to its necessary air propellers. In spite of these shortcomings the LCAC has been procured in reasonably large numbers due to its very valuable amphibious and 45 knot speed capabilities. The amphibious capability allows driving up onto a beach and discharging troops and cargo on dry land above the surf line.

The current Navy/Marine Sea Basing program has pointed out the need for beachable reasonably high speed marine transports that are referred to as HSCs (High Speed Connectors). The concept behind Sea Basing is to have large supply ships positioned about 200 miles offshore with troops, supplies, vehicles, etc. transported to beachheads by the HSCs. Some of Applicant's other patent application(s) address this need in the form of large beachable air cushioned marine vehicles. These inventive concepts of Applicant are mostly related to the SeaCoaster® SECAT (Surface Effect CATamaran) high speed marine vehicle.

The instant invention advanced marine vehicle proposed herein offers reasonably high speeds based on generally existing and proven hull designs that are rendered amphibious by used of the instant invention technology. This is accomplished by use of retractable land or other hard surface drives that are stowed upward between, forward of, or aft of water contacting hulls when the vehicle is operating on a water surface. This retraction upward of the land drives reduces the water contact of the drives during marine operation of the vehicle thereby reducing water drag. Some of the multi-hull types that this inventive technology may be applied to, but not limited to, include catamarans (two water contacting hulls), trimarans (three water contacting hulls), quadramarans (four water contacting hulls), pentamarans (five water contacting hulls), and the like. For best efficiencies, a trimaran and a pentamaran would normally have a single long and slender main hull with the extra hulls in outrigger hull arrangements to add stability and allow a wider deck. It is also to be noted that a quadramaran may consist either of four independent parallel hulls or sets of fore and aft hulls in an overall catamaran arrangement. It is to be noted also that the instant invention technology can be added to applicant's SeaCoaster® or other of his multi-hulled air cushioned marine vehicle inventions as well.

SUMMARY OF THE INVENTION

It is a primary object of the invention to offer an advanced marine vehicle that is convertible to an amphibious operation configuration when beachheads are encountered.

It is a related object of the invention that it include a land transport means that is, at least partially, retractable upward to reduce water contact when the marine vehicle is waterborne.

It is a further object of the invention that it have multiple hulls where multiple is defined herein as being two or more.

It is a related object of the invention that the multiple hulls maybe made in mechanical communication by connecting structure.

It is yet another object of the invention that it include a first land transport means.

Another object of the invention is that said first land transport means, when the advanced amphibious marine vehicle encounters a hard surface, is extendable downward to make hard surface contact and thereby provide hard surface transport means for the advanced amphibious marine vehicle.

A related object of the invention is that it may include a second land transport means that, when the advanced amphibious marine vehicle is moving forward at high speed on a water surface, is at least in part retracted upward to a higher elevation than lower water contacting hull portions of the advanced amphibious marine vehicle to thereby reduce water contact of the second land transport means and wherein said second land transport means, when the advanced amphibious marine vehicle encounters a hard surface, is extendable downward to make hard surface contact and thereby provide hard surface transport means for the advanced amphibious marine vehicle.

It is yet another related object of the invention that it may include a third land transport means.

It is still another related object of the invention that it may include a fourth land transport means.

A further object of the invention is that may have a catamaran hull configuration.

Yet another object of the invention is that it may have a trimaran hull configuration.

Still another object of the invention is that it may have a quadramaran hull configuration.

A further object of the invention is that the first land transport means may, at least in part, retract aft and upward between water contacting hull portions during high speed waterborne operation of the advanced amphibious marine vehicle.

Another object of the invention is that the first land transport means may, at least in part, retract forward and upward between water contacting hull portions during high speed waterborne operation of the advanced amphibious marine vehicle.

Still another object of the invention is that the first land transport means may, at least in part, retract vertically upward between water contacting hull portions during high speed waterborne operation of the advanced amphibious marine vehicle.

Yet another object of the invention is that the second land transport means may, at least in part, retract forward and upward between water contacting hull portions during high speed waterborne operation of the advanced amphibious marine vehicle.

A further object of the invention is that said first land transport means, when retracted upward, may be, as seen in a bottom plan view of the advanced amphibious marine vehicle, at least partially disposed between water contacting hulls of the advanced amphibious marine vehicle.

A related object of the invention is that said first land transport means may be, at least partially, retractable upward into a recess in connecting structure that connects water contacting hulls of said advanced amphibious marine vehicle.

Another object of the invention is that the first land transport means may include a track drive means wherein said track drive means makes hard surface contact during beaching operation of the advanced amphibious marine vehicle.

Still another object of the invention is that the first land transport means may include a tire drive means that makes hard surface contact during beaching operations of the advanced amphibious marine vehicle.

Another object of the invention is that the first land transport means may be, at least partially, energized by power takeoff means from a first marine propulsion system.

A related object of the invention is that the power takeoff means may include a hydraulic pressure generator.

Another related object of the invention is that drive energy for the first land transport means may be, at least in part, from a hydraulic motor disposed, at least in part, internal to the first land transport means.

A further related object of the invention is that drive energy for the first land transport means may include a hydraulic drive motor wherein said hydraulic drive motor powers a track drive gear.

Another object of the invention is that drive energy for the first land transport means may include a hydraulic drive motor wherein said hydraulic drive motor powers a wheel like device.

Still another object of the invention is that the first land transport means may be steerable.

Yet another object of the invention is that, during high speed waterborne operation, said advanced amphibious marine vehicle is, at least in part, propelled by a first water propulsor energized with power supplied by a first propulsor motor and propelled when land borne, at least in part, by its first land transport means wherein said first land transport means is energized with power supplied by the first propulsor motor.

Another object of the invention is that a first propulsor motor may drive a gearbox with output from said gearbox driving a first water propulsor when the advanced amphibious marine vehicle is waterborne and which further comprises a first hydraulic pressure generator that supplies hydraulic power to drive a first land transport means hydraulic drive motor when the advanced amphibious marine vehicle is land borne.

Still another object of the invention is that attachment arms may be disposed either side of the first land transport means.

BRIEF DESCRIPTION OF THE FIGURES

FIG. 1 presents a profile view of the instant invention amphibious marine vehicle when it is operation at high speed on a calm sea surface. High speed is defined herein as speeds of 15 knots or more.

FIG. 2 is a bow view of the instant invention vehicle from FIG. 1.

FIG. 3 presents a stem view of the instant invention vehicle of FIG. 1.

FIG. 4 is a profile view of the instant invention amphibious marine vehicle when operating in its land borne mode with its land drives or land transport means down and in land contact for over land transit. It is to be noted that the term land here is meant to include any hard surface and may include a ramp on a ship, a portion of a dock, portions of pontoon bridges or other bridge types, beach matting, or the like.

FIG. 5 gives a bow view of the instant invention vehicle of FIG. 4.

FIG. 6 is a stem view of the instant invention vehicle of FIG. 4.

FIG. 7 presents a cross-sectional view, as taken through vertical centerline plane 7—7 of FIG. 2 that shows the land drives retracted into their upward positions. Note that while a preferred arrangement four land drive system is shown here that single, double, or other multiple track land drives can be used. In the case of a double land drive, there could be one wide land drive forward and one wide land drive aft. It would also be possible that a single large land drive could be used to replace all four of the land drives shown here. It is all a matter of design preference and all variations are considered well within the scope and intent of the instant invention.

FIG. 8 presents a cross-sectional view, as taken through vertical plane 8—8, of FIG. 2, that shows operation on a hard surface such as a beachhead with the land drives deployed downward and in land contact.

FIG. 9 shows a bottom plan view of the instant invention amphibious marine vehicle with its land drives retracted up for waterborne operation on its starboard side and down for land borne operation on its port side. These arrangements are made for purposes of illustration since the land drives are normally up or down dependent upon if the instant invention marine vehicle is in its waterborne or land borne mode of operation.

FIG. 10 presents a starboard side view of a trimaran incorporating the instant invention that is in its waterborne mode of operation.

FIG. 11 is a bow view of the trimaran presented in FIG. 10. Note the center hull that is the main load carrying hull and the stabilizing outrigger type sidehulls that add stability and a wider top deck.

FIG. 12 is a stem view of the trimaran of FIGS. 10 and 11.

FIG. 13 shows the trimaran of FIGS. 10–12 when its land borne mode with its land drives extending down and making hard surface contact.

FIG. 14 is a bow view of the trimaran of FIG. 13.

FIG. 15 is a stern view of the trimaran of FIG. 13.

DETAILED DESCRIPTION

Figure 16:
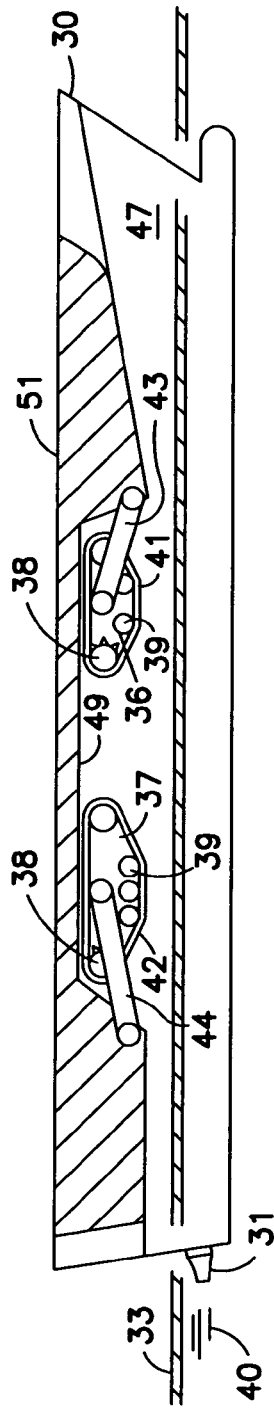
FIG. 16 presents a cross-sectional view, as taken through vertical plane 16—16 of FIG. 11, that shows the instant invention amphibious marine vehicle while waterborne with its land drives retracted upward out of water contact.

FIG. 1 presents a profile view of the instant invention amphibious marine vehicle 30 when it is operation water borne at high speed on a calm sea surface. The sea surface waterline 33, a water propulsor 31, water propulsor discharge flow 40, and starboard sidehull 46 of this hull variation that is a basic catamaran 50 as shown here.

FIG. 2 is a bow view of the instant invention vehicle 30 from FIG. 1. Additional items shown are port sidehull 45, multiple hull connecting structure 48, and vertical centerline plane 35.

FIG. 3 presents a stern view of the instant invention vehicle 30 of FIG. 1.

FIG. 4 is a profile view of the catamaran hull configuration version of the instant invention amphibious marine vehicle 30 when operating in its land borne mode. This shows its land drives or land transport means 36, 37 down and in land contact for over land transit. Components of the land drive shown, in this preferred embodiment, include: drive gears 38, forward track 41, aft track 42, and track guide or follower wheels 39. It is to be noted that the term land 34 here is meant to include any hard surface and may include a beach, a ramp of a ship, a portion of a dock, portions of pontoon bridges or other bridge types, beach matting, or the like.

FIG. 5 gives a bow view of the instant invention vehicle of FIG. 4. An additional item shown here is a forward attachment arm(s) 43 shown as a yoke like design here but that may take any form so long as it acts to attach the land drive 36 to the connecting structure 48 or any other part of the advanced amphibious marine vehicle 30. Note that the forward land drive 36 is, in the preferred embodiment, steerable.

FIG. 6 is a stern view of the instant invention advanced amphibious marine vehicle 30 of FIG. 4. An additional item shown here are aft attachment arms 44.

FIG. 7 presents a cross-sectional view, as taken through vertical centerline plane 7—7 of FIG. 2 that shows the land drives 36, 37 retracted into their upward positions. Note that while a preferred arrangement four land drive system is shown here that single, double, or other multiple track land drives can be used. In the case of a double land drive, there could be one wide land drive forward and one wide land drive aft. It would also be possible that a single large land drive could be used to replace all four of the land drives shown here. It is all a matter of design preference and all variations are considered well within the scope and intent of the instant invention.

FIG. 8 presents a cross-sectional view, as taken through vertical plane 8—8, of FIG. 2, that shows operation on a hard surface such as a beachhead with the land drives 36, 37 deployed downward and in land contact. A connecting structure recess 49 is provided in this preferred embodiment of the invention wherein said recess 49 is used to at least partially provide location for a land drive(s) 36, 37 when the land drive(s) 36, 37 is retracted upward during water borne operation. Track drive systems include, in this preferred embodiment of the invention, powered drive gears 38, and follower rollers or track guides 39. It is important to note that other types of land contact means such as tires or the like may be used and, although not shown herein, are considered within the spirit and scope of the invention as are drive motors such as hydraulic motors, normally used to drive the powered drive gears 38, tires, or other means of land contact.

A preferred propulsion system(s) utilizes the same engines to drive during both water borne and land borne operation. This can be accomplished by use of a multi-output transmission attached to a propulsion engine(s). In the preferred embodiment of the instant invention, the outputs of the transmissions drive either a water propulsor 31 or a hydraulic pressure generator. The output of the hydraulic pressure generator in turn drives a hydraulic motor that drives a drive gear in a track drive, a tire, or other means of power transmission. While the propulsion system, other than external portions of one type of water propulsor, are not shown it is considered well within the spirit and scope of the instant invention.

FIG. 9 shows a bottom plan view of the instant invention amphibious marine vehicle 30 with its land drives 36, 37 retracted up for waterborne operation on its starboard side and down for land borne operation on its port side. These arrangements are made for purposes of illustration since the land drives 36, 37 are normally up or down dependent upon if the instant invention marine vehicle is in its water borne or land borne mode. Water inlets 32 of the water propulsors 31 are also shown.

FIG. 10 presents a starboard side view of a trimaran 51 incorporating the instant invention that is shown in its waterborne mode of operation here. An advantage of the trimaran 51 hull arrangement is that a single long and slender main hull 47 that is stabilized by outrigger hull(s) 46 offers relatively high efficiency, good seakeeping, and a wide deck. The efficiency improvements are due to the low speed/length ratio (Froude Number) of such a long fine center hull 46. It is to be noted that any number of multi-hull arrangements are considered within the scope of the instant invention. In the case of what is sometimes called the quadramaran, four water contacting hulls may be arranged in parallel or with two of the hulls placed in fore and aft arrangement on either side of the vehicle. Another novel arrangement is the pentamaran that has a single main hull with outrigger hulls disposed fore and aft of each other. Any of these or other arrangements of multiple hulls may be employed and are considered within the scope of the invention.

FIG. 11 is a bow view of the trimaran 51 presented in FIG. 10. Note the center hull 47 that is the main load carrying hull and the stabilizing outrigger type sidehulls 45, 46 that add stability and a wider top deck. The connecting structure 48 is also shown.

FIG. 12 is a stern view of the trimaran 51 of FIGS. 10 and 11.

FIG. 13 shows the trimaran 51 of FIGS. 10–12 when its land borne mode with its land drives 36, 37 extending down and making hard surface contact.

FIG. 14 is a bow view of the trimaran 51 of FIG. 13.

FIG. 15 is a stern view of the trimaran 51 of FIG. 13.

FIG. 16 presents a cross-sectional view, as taken through vertical plane 16—16 of FIG. 11, that shows a trimaran variation 51 of the instant invention amphibious marine vehicle 30 while waterborne with its land drives 36, 37 retracted upward out of water contact. In this example, they are at least mainly retracted into recess 49.

Figure 17:
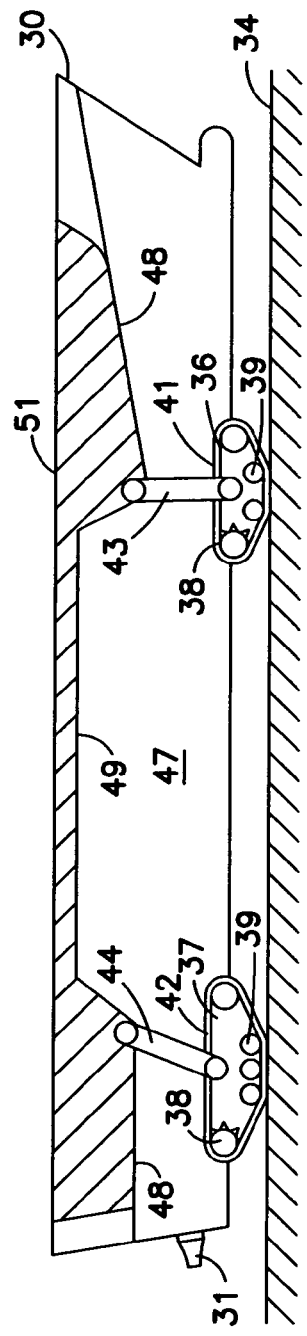
FIG. 17 is a cross-sectional view, as taken through vertical plane 17—17 of FIG. 14, showing the instant invention amphibious marine vehicle with its land drives down and in hard surface contact.

FIG. 17 is a cross-sectional view, as taken through vertical plane 17—17 of FIG. 14, showing the trimaran 51 version of the instant invention amphibious marine vehicle 30 with its land drives 36, 37 down and in hard surface contact. It is to be noted that land drive(s) may retract forward, aft, or vertically as works out best by design.

Figure 18:
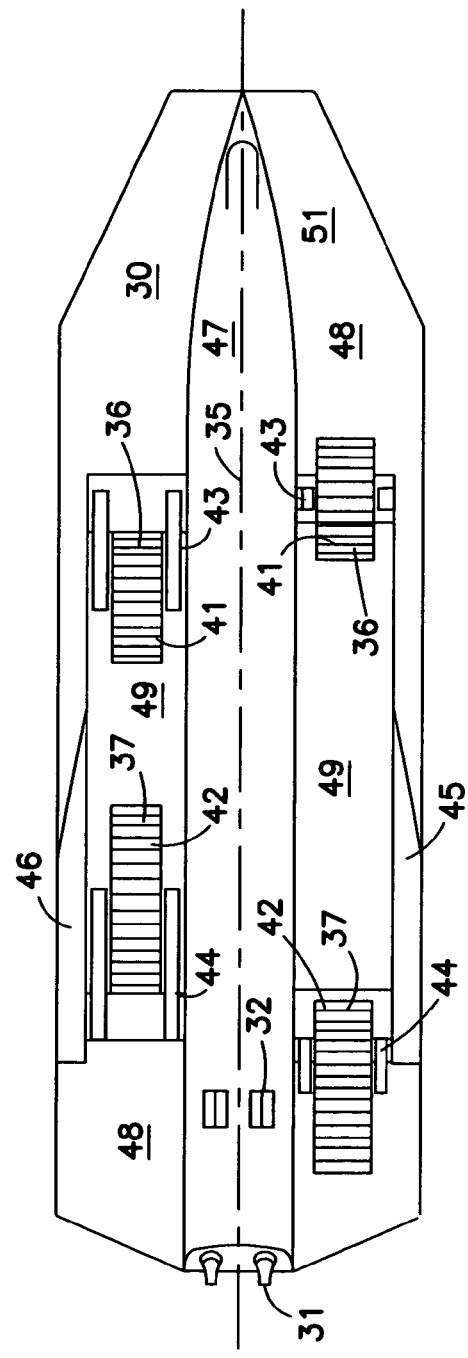
FIG. 18 gives a bottom plan view of the trimaran to the instant inventive design with its land drives retracted upward on its starboard side for water borne operation and extended downward on its port side for land borne operation.

FIG. 18 gives a bottom plan view of the trimaran 51 to the instant inventive design with its land drives 36, 37 retracted upward on its starboard side for water borne operation and extended downward on its port side for land borne operation. Note that sidehulls do not border the forward land drives 36 in this trimaran 51 arrangement. That could be done with a pentarnaran or other multi-hull design, not shown herein, where there would simply be two more sidehulls with one placed either side of forward land drives 36.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an advanced amphibious marine vehicle, the improvement comprising:

said advanced amphibious marine vehicle having multiple hulls with said multiple hulls in mechanical communication by means of connecting structure, a first land transport means that, when the advanced amphibious marine vehicle is moving forward on a water surface, is at least in part retracted upward to a higher elevation than lower water contacting hull portions of said advanced amphibious marine vehicle to thereby reduce water contact of the first land transport means and wherein said first land transport means, when the advanced amphibious marine vehicle encounters a hard surface, is extendable downward to make hard surface contact and thereby provide hard surface transport means for the advanced amphibious marine vehicle and wherein said first land transport means includes a track drive means wherein said track drive means makes hard surface contact during beaching operation of the advanced amphibious marine vehicle.

2. The advanced amphibious marine vehicle of claim 1 which further comprises a second land transport means that, when the advanced amphibious marine vehicle is moving forward at high speed on a water surface, is at least in part retracted upward to a higher elevation than lower water contacting hull portions of said advanced amphibious marine vehicle to thereby reduce water contact of the second land transport means and wherein said second land transport means, when the advanced amphibious marine vehicle encounters a hard surface, is extendable downward to make hard surface contact and thereby provide hard surface transport means for the advanced amphibious marine vehicle.

3. The advanced amphibious marine vehicle of claim 2 which further comprises a third land transport means that, when the advanced amphibious marine vehicle is moving forward at high speed on a water surface, is at least in part retracted to a higher elevation than lower water contacting hull portions of said advanced amphibious marine vehicle to thereby reduce water contact of the third land transport means and wherein said third land transport means, when the advanced amphibious marine vehicle encounters a hard surface, is extendable downward to make hard surface contact and thereby provide hard surface transport means for the advanced amphibious marine vehicle.

4. The advanced amphibious marine vehicle of claim 3 which further comprises a fourth land transport means that, when the advanced amphibious marine vehicle is moving forward at high speed on a water surface, is at least in part retracted to a higher elevation than lower water contacting hull portions of said advanced amphibious marine vehicle to thereby reduce water contact of the fourth land transport means and wherein said fourth land transport means, when the advanced amphibious marine vehicle encounters a hard surface, is extendable downward to make hard surface contact and thereby provide hard surface transport means for the advanced amphibious marine vehicle.

5. The advanced amphibious marine vehicle of claim 1 wherein said advanced amphibious marine vehicle has a catamaran hull configuration.

6. The advanced amphibious marine vehicle of claim 1 wherein said advanced amphibious marine vehicle has a trimaran hull configuration.

7. The advanced amphibious marine vehicle of claim 1 wherein said advanced amphibious marine vehicle has a quadramaran hull configuration.

8. The advanced amphibious marine vehicle of claim 1 wherein said first land transport means, at least in part, retracts aft and upward between water contacting hull portions during high speed waterborne operation of the advanced amphibious marine vehicle.

9. The advanced amphibious marine vehicle of claim 1 wherein said first land transport means, at least in part, retracts forward and upward between water contacting hull portions during high speed waterborne operation of the advanced amphibious marine vehicle.

10. The advanced amphibious marine vehicle of claim 1 wherein said first land transport means, at least in part, retracts vertically upward between water contacting hull portions during high speed waterborne operation of the advanced amphibious marine vehicle.

11. The advanced amphibious marine vehicle of claim 2 wherein said second land transport means, at least in part, retracts forward and upward between water contacting hull portions during high speed waterborne operation of the advanced amphibious marine vehicle.

12. The advanced amphibious marine vehicle of claim 1 wherein said first land transport means, when retracted upward, is, as seen in a bottom plan view of the advanced amphibious marine vehicle, at least partially disposed between water contacting hulls of the advanced amphibious marine vehicle.

13. The advanced amphibious marine vehicle of claim 1 wherein said first land transport means is, at least partially, retractable upward into a recess in connecting structure that connects water contacting hulls of said advanced amphibious marine vehicle.

14. The advanced amphibious marine vehicle of claim 2 wherein said second land transport means includes a tire drive means that makes hard surface contact during beaching operations of the advanced amphibious marine vehicle.

15. The advanced amphibious marine vehicle of claim 1 wherein the first land transport means is, at least partially, energized by power takeoff means from a first marine propulsion system.

16. The advanced amphibious marine vehicle of claim 13 wherein the power takeoff means includes a hydraulic pressure generator.

17. The advanced amphibious marine vehicle of claim 1 wherein drive energy for the first land transport means is, at least in part, from a hydraulic motor disposed, at least in part, internal to the first land transport means.

18. The advanced amphibious marine vehicle of claim 1 wherein drive energy for the first land transport means includes a hydraulic drive motor wherein said hydraulic drive motor powers a track drive gear.

19. The advanced amphibious marine vehicle of claim 1 wherein said first land transport means is steerable.

20. The advanced amphibious marine vehicle of claim 1 wherein, during high speed waterborne operation, said advanced amphibious marine vehicle is, at least in part, propelled by a first water propulsor energized with power supplied by a first propulsor motor and propelled when land borne, at least in part, by its first land transport means wherein said first land transport means is energized with power supplied by the first propulsor motor.

21. The advanced amphibious marine vehicle of claim 1 wherein a first propulsor motor drives a gearbox with output from said gearbox driving a first water propulsor when the advanced amphibious marine vehicle is waterborne and which further comprises a first hydraulic pressure generator that supplies hydraulic power to drive a first land transport means hydraulic drive motor when the advanced amphibious marine vehicle is land borne.

22. The advanced amphibious marine vehicle of claim 1 wherein attachment arms are disposed either side of the first land transport means.

23. In an advanced amphibious marine vehicle, the improvement comprising:
said advanced amphibious marine vehicle having multiple hulls with said multiple hulls in mechanical communication by means of connecting structure, a first land transport means that, when the advanced amphibious marine vehicle is moving forward on a water surface, is at least in part retracted upward to a higher elevation than lower water contacting hull portions of said advanced amphibious marine vehicle to thereby reduce water contact of the first land transport means and wherein said first land transport means, when the advanced amphibious marine vehicle encounters a hard surface, is extendable downward to make hard surface contact and thereby provide hard surface transport means for the advanced amphibious marine vehicle and wherein drive energy for the first land transport means includes a hydraulic drive motor wherein said hydraulic drive motor powers a track drive gear.

24. In an advanced amphibious marine vehicle, the improvement comprising: said advanced amphibious marine vehicle having multiple hulls with said multiple hulls in mechanical communication by means of connecting structure, a first land transport means that, when the advanced amphibious marine vehicle is moving forward on a water surface, is at least in part retracted upward to a higher elevation than lower water contacting hull portions of said advanced amphibious marine vehicle to thereby reduce water contact of the first land transport means and wherein said first land transport means, when the advanced amphibious marine vehicle encounters a hard surface, is extendable downward to make hard surface contact and thereby provide hard surface transport means for the advanced amphibious marine vehicle and wherein, during high speed waterborne operation, said advanced amphibious marine vehicle is, at least in part, propelled by a first water propulsor energized with power supplied by a first propulsor motor and propelled when land borne, at least in part, by its first land transport means wherein said first land transport means is energized with power supplied by the first propulsor motor.

25. The advanced amphibious marine vehicle of claim 24 wherein the first propulsor motor drives a gearbox with output from said gearbox driving the first water propulsor when the advanced amphibious marine vehicle is waterborne and which further comprises a first hydraulic pressure generator that supplies hydraulic power to drive a first land transport means hydraulic drive motor when the advanced amphibious marine vehicle is land borne.

26. The advanced amphibious marine vehicle of claim 24 which further comprises a second land transport means that, when the advanced amphibious marine vehicle is moving forward at high speed on a water surface, is at least in part retracted upward to a higher elevation than lower water contacting hull portions of said advanced amphibious marine vehicle to thereby reduce water contact of the second land transport means and wherein said second land transport means, when the advanced amphibious marine vehicle encounters a hard surface, is extendable downward to make hard surface contact and thereby provide hard surface transport means for the advanced amphibious marine vehicle.

27. The advanced amphibious marine vehicle of claim 24 wherein drive energy for the first land transport means includes a hydraulic drive motor wherein said hydraulic drive motor powers a track drive gear.

28. The advanced amphibious marine vehicle of claim 24 wherein drive energy for the first land transport means includes a hydraulic drive motor wherein said hydraulic drive motor powers a wheel like device.

29. The advanced amphibious marine vehicle of claim 24 wherein attachment arms are disposed either side of the first land transport means.

* * * * *